Nov. 5, 1957 — G. D. WACHTENDORFF — 2,812,020
PROJECTION SCREEN
Filed Nov. 3, 1952 — 3 Sheets-Sheet 1
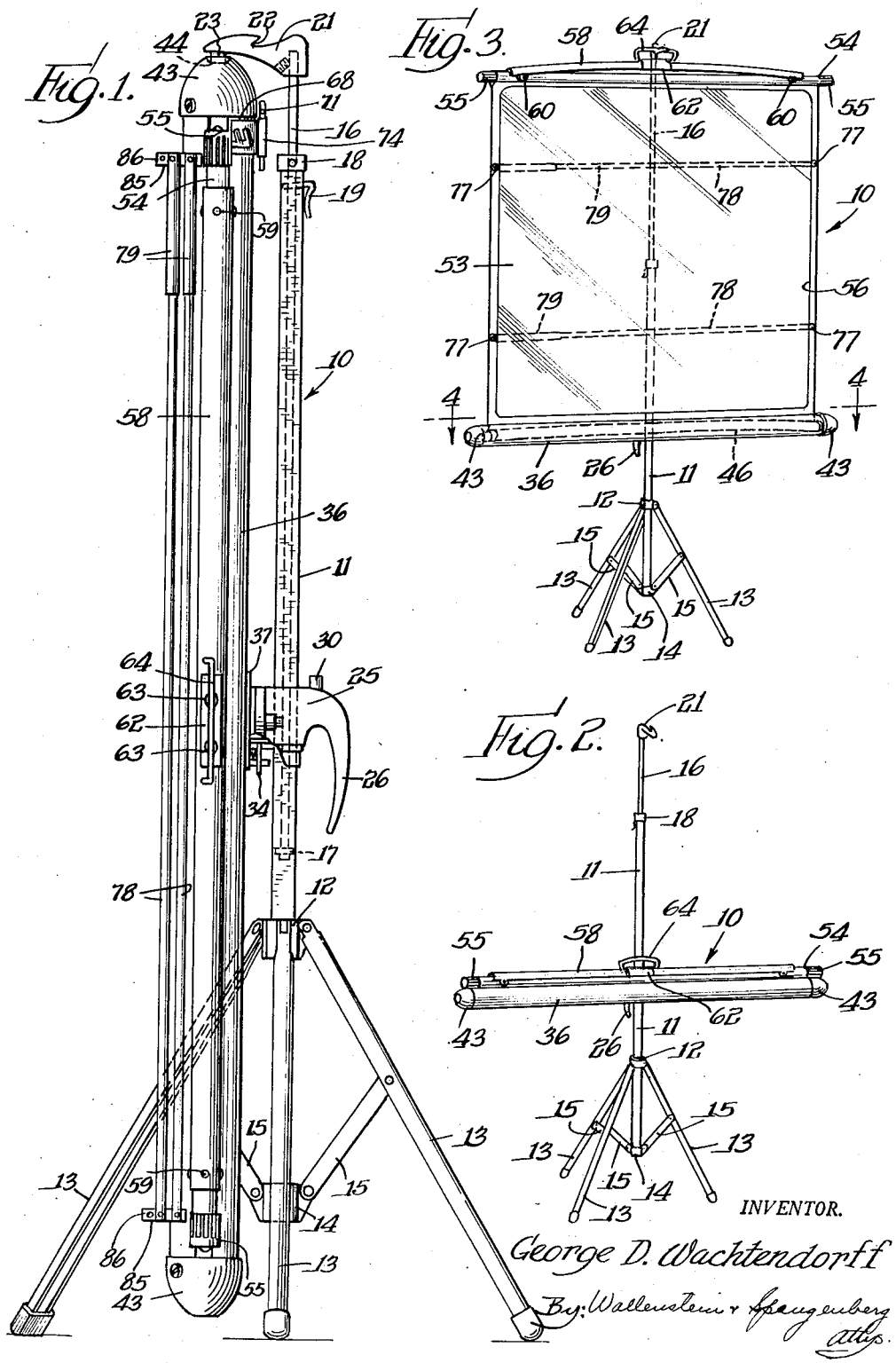
INVENTOR.
George D. Wachtendorff
By: Wallenstein & Spangenberg
attys.

Nov. 5, 1957
G. D. WACHTENDORFF
2,812,020
PROJECTION SCREEN
Filed Nov. 3, 1952
3 Sheets-Sheet 2
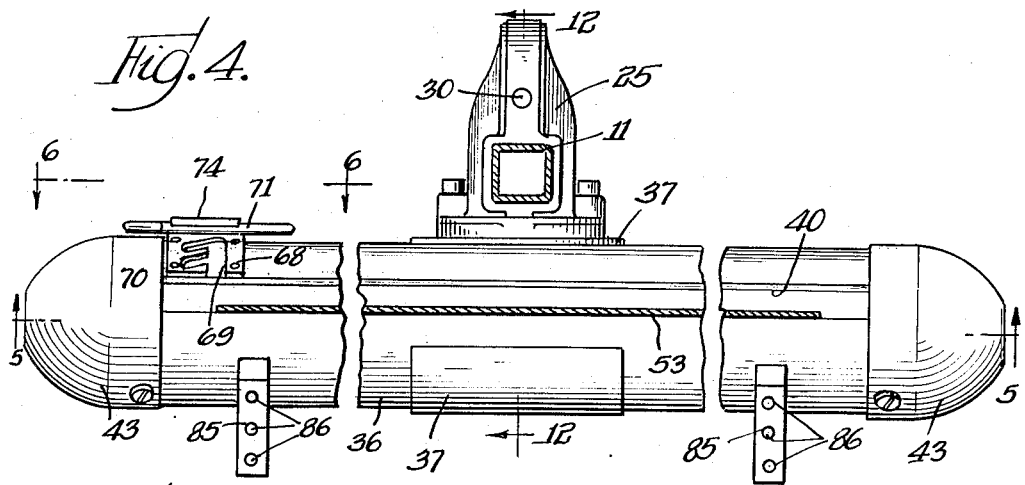
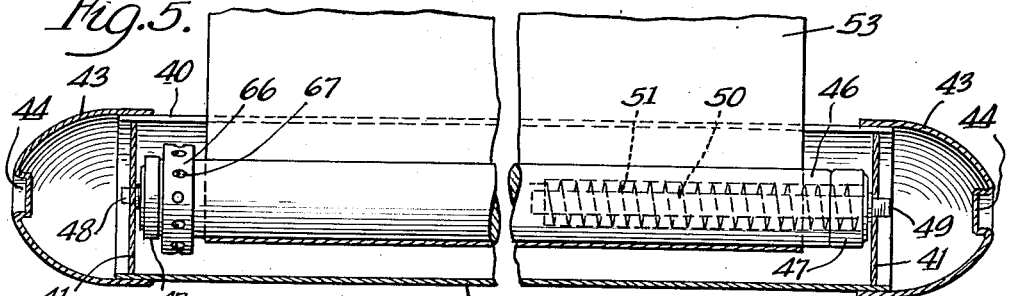
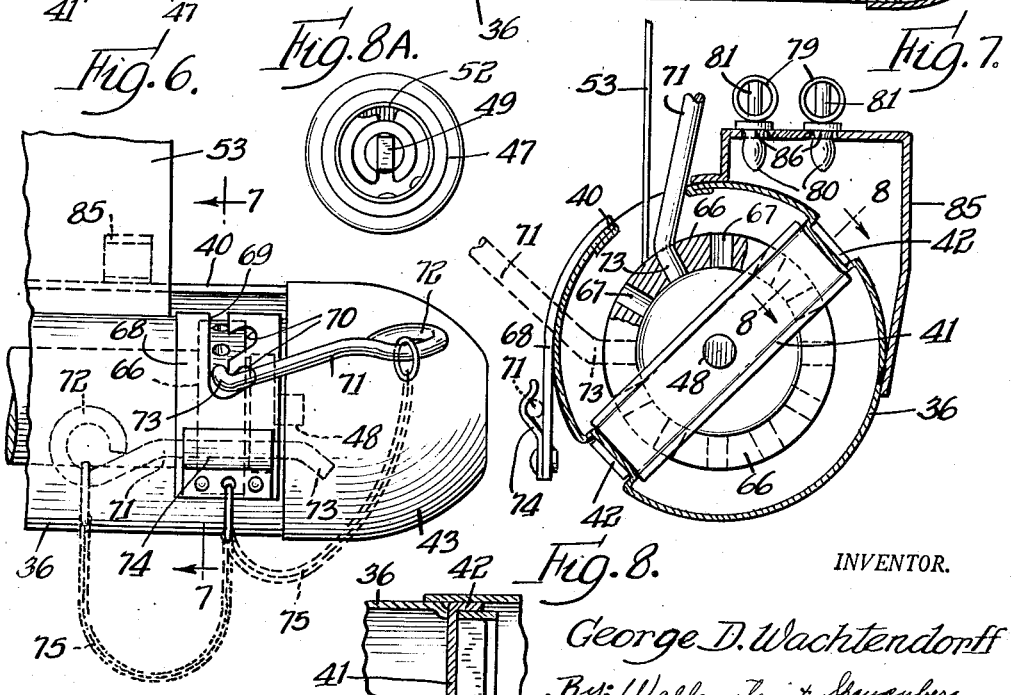
INVENTOR.
George D. Wachtendorff Nov. 5, 1957          G. D. WACHTENDORFF          2,812,020
PROJECTION SCREEN
Filed Nov. 3, 1952                                        3 Sheets-Sheet 3
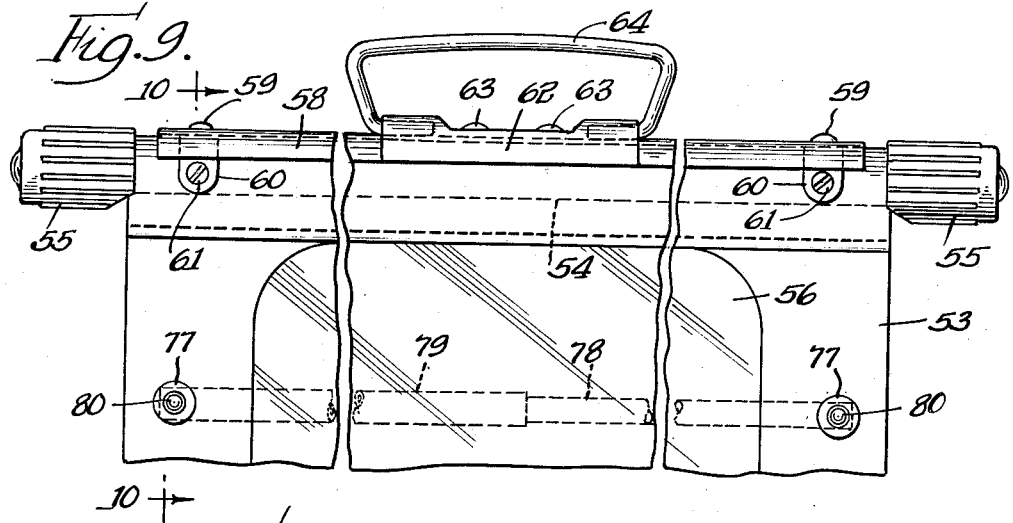
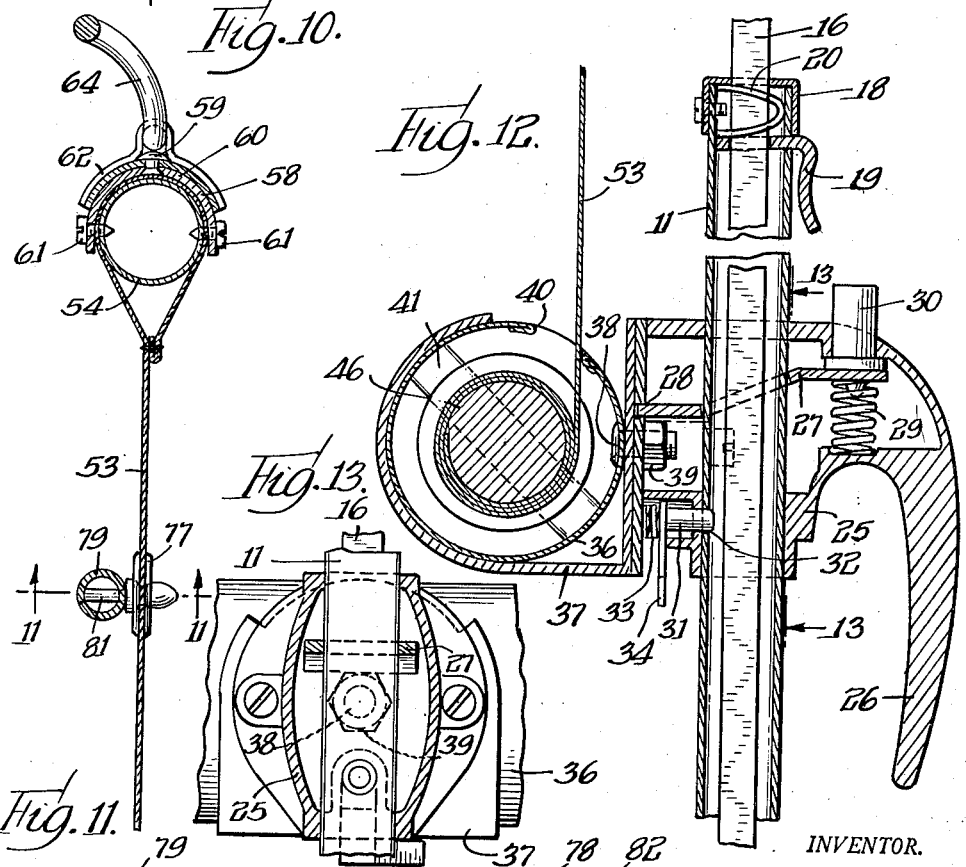
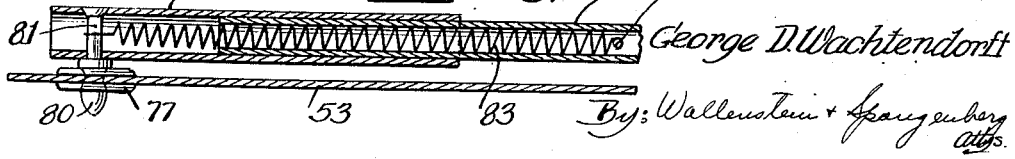
INVENTOR.
George D. Wachtendorff
By: Wallenstein + Spangenberg
                     attys.

United States Patent Office 2,812,020
Patented Nov. 5, 1957

2,812,020

PROJECTION SCREEN

George D. Wachtendorff, Palatine, Ill., assignor to Radiant Manufacturing Corporation, Chicago, Ill., a corporation of Illinois Application November 3, 1952, Serial No. 318,415

14 Claims. (Cl. 160—24)

This invention relates to projection screens for use in exhibiting pictures projected thereon.

The principal object of this invention is to provide an improved projection screen for use in exhibiting three dimensional pictures wherein a flexible screen carried by a roller may be unrolled and tensioned in a manner to provide a substantially flat exhibiting surface for the projected three dimensional pictures, the tensioning of the screen preferably being in both longitudinal and transverse directions.

Briefly, the projection screen includes a supporting stand, a screen case carried by the supporting stand, a spring actuated or urged roller journaled in the screen case, a flexible screen secured at one end to the roller and adapted to be rolled thereon and having a suspension slat at its other end, and a hook on the supporting stand spaced from the screen case for supporting the suspension slat when the screen is unrolled. This structure thus far described is conventional and may be of any desired type. For example, the stand may be a collapsible stand having collapsible legs, an adjustable extension rod carrying the hook and an adjustable mounting for the screen case which also allows pivoting of the screen case with respect to the stand.

In accordance with this invention any such projection screen of any desired type is provided with resilient means for releasably securing the suspension slat to the hook in picture exhibiting position when the screen is unrolled from the roller, means for manually rotating and locking the roller for pulling the screen against the action of the resilient means for longitudinally tensioning the screen in picture exhibiting position, and means for transversely tensioning the screen in picture exhibiting position.

The resilient means for releasably securing the suspension slat to the hook preferably includes a resilient strip, means for securing the ends of the resilient strip to the screen suspension slat adjacent its ends and a bail carried by the resilient strip adjacent its center for engaging over the hook. The means for manually rotating and locking the roller for longitudinally tensioning the screen in picture exhibiting position preferably includes a ring carried by the roller and provided with radially extending holes, a slot in the screen case adjacent the ring and having laterally extending latch surfaces or recesses, and a pin removably received in the holes of the ring and movable along the slot for tensioning purposes and into the latch surfaces or recesses for locking purposes. The means for transversely tensioning the screen in picture exhibiting position preferably includes eyelets at the marginal edges of the screen and spring actuated or urged extensible rods having studs received in the eyelets.

In this way the flexible screen carried by the roller is longitudinally and transversely tensioned when unrolled to picture exhibiting position to provide a substantially flat exhibiting surface, it being necessary for best results to present a flat exhibiting surface for exhibiting three dimensional pictures projected thereon. Preferably, a clip is carried by the screen case for receiving the pin when not received in the ring holes and brackets provided with holes are carried by the screen case for receiving the studs of the rods to support the rods when the studs are not received in the screen eyelets.

Further objects of this invention reside in the details of construction of the projection screen and in the cooperative relationships between the component parts thereof.

Other objects and advantages of this invention will become apparent to those skilled in the art upon reference to the accompanying specification, claims and drawings, in which:

Fig. 1 is a side elevational view of the projection screen of this invention with the legs of the supporting stand extended and with the screen case vertically arranged;

Fig. 2 is a perspective view of the projection screen with the screen case horizontally located and with the screen contained within the screen case;

Fig. 3 is a view similar to Fig. 2 but illustrating the screen in picture exhibiting position;

Fig. 4 is a horizontal sectional view taken substantially along the line 4—4 of Fig. 3;

Fig. 5 is a vertical sectional view taken substantially along the line 5—5 of Fig. 4;

Fig. 6 is a partial elevational view looking from the rear of the screen and taken substantially along the line 6—6 of Fig. 4;

Fig. 7 is a vertical sectional view taken substantially along the line 7—7 of Fig. 6;

Fig. 8 is a sectional view taken substantially along the line 8—8 of Fig. 7;

Fig. 8A is an elevational view of the end of the screen roller looking from the right hand side of Fig. 5;

Fig. 9 is a front elevational view of the upper part of the projection screen;

Fig. 10 is a vertical sectional view taken substantially along the line 10—10 of Fig. 9;

Fig. 11 is a horizontal sectional view taken substantially along the line 11—11 of Fig. 10;

Fig. 12 is a vertical sectional view taken substantially along the line 12—12 of Fig. 4;

Fig. 13 is a vertical sectional view taken substantially along the line 13—13 of Fig. 12.

Referring first to Figs. 1 to 3, the projection screen of this invention is generally designated at 10. It includes an upright tube 11. A bracket 12 is slidably carried on the upright tube 11 and a plurality of legs 13 are pivotally secured to the bracket 12. Fixed to the bottom of the upright tube 11 is a bracket 14 and links 15 are pivotally secured to this bracket 14 and to the legs 13. The legs 13 may be folded together for transportation purposes and when this is done, the bracket 12 slides upwardly on the upright tube 11. Suitable latch means not shown are preferably provided for holding the legs 13 in collapsed position. When the legs 13 are extended for exhibiting purposes as illustrated in Figs. 1 to 3 the bracket 12 slides downwardly on the upright tube 11. In this way the supporting stand is maintained in an upright position.

An extension rod 16 is slidably mounted in the upright tube 11, the extension rod being guided for vertical movement by a collar 17 carried on the lower end of the extension rod and a cap 18 carried on the upper end of the upright tube 11. The extension rod 16 is maintained in any desired extended position by a nipping lever 19 extending through a suitable opening in the upright tube 11 and gripping the extension rod 16. The nipping lever is resiliently urged into gripping position by means of a spring 20 as illustrated in Fig. 12 and the action of this spring may be overcome by manually manipulating the nipping lever 19 to allow desired adjustment of the position of the extension rod 16. The upper end of the extension rod 16 carries a bracket 21 having a hook portion 22 and a knob 23.

A handle member 25 having a handle 26 is slidably carried on the upright tube 11. As shown more particularly in Figs. 12 and 13, a nipping lever 27 is pivoted at 28 in the handle member 25 for gripping the upright tube 11. This nipping lever 27 is urged into gripping position by a spring 29. A button 30 extending through the handle member 25 may be depressed to overcome the action of the spring 29 for releasing the gripping action of the nipping lever 27 on the upright tube 11 so that the handle member 25 may be adjusted upwardly and downwardly on the upright tube 11 to any desired position. The handle member 25 is also provided with a pin 31 which is adapted to enter holes 32 in the upright tube 11 for positively positioning the handle member 25 at selected points along the upright tube. For example, the upright tube 11 may be provided with a hole 32 for positioning the handle member 25 in a lowered position as illustrated in Fig. 1 when the projection screen is to be collapsed and it may be provided with another hole 32 for fixing the position of the handle member 25 in an upper position for projection purposes as illustrated in Fig. 3. The pin 31 is urged into the holes 32 by a spring 33. The pin 31 is provided with an extension 34 for overcoming the action of the spring 33 and for withdrawing the pin 31 from the holes 32 to permit longitudinal adjustment of the handle member 25.

A screen case 36 is secured to a bracket 37 as by welding and the bracket 37 is pivotally mounted on the handle member 25 by a bolt 38 and nut 39. Thus, the screen case 36 may be rotated with respect to the handle member 25 between a vertical position as illustrated in Fig. 1 for collapsing purposes and a horizontal position as illustrated in Figs. 2 and 3 for picture projection purposes. The screen case 36 is provided with an elongated slot 40 along the upper side thereof through which the projection screen may extend. Adjacent each end of the screen case 36 there is provided a supporting member 41 which is held in place by ears 42 extending through slots in the screen case 36 as illustrated in more detail in Figs. 7 and 8. If desired the supporting members 41 may be welded in place. The ends of the screen case 36 are provided with closure caps 43 which in turn are provided with recesses 44 which cooperate with the knob 23 on the bracket 21 for locking the screen case 36 in a vertical position as illustrated in Fig. 1.

A roller 46 is carried by the supporting members 41 within the screen case 36. The roller 46 is provided with end members 47 which in turn carry bearing members 48 and 49 which are mounted in the supporting members 41. The bearing member 48 is preferably round and is journaled for rotation in the supporting member 41. The other bearing member 49 is preferably rectangular in cross section and is fixed against rotation in the supporting member 41. Bearing member 49 is provided with a rod 50 extending into the roller 46 and a torsion spring 51 is connected between the rod 50 and the roller 46. The arrangement is such that as the screen is pulled from the screen case 36 the spring 51 is tightened; thus, the spring 51 operates to pull the screen into the screen case 36. The roller construction here illustrated is of conventional form and may be provided with a suitable control dog 52 as illustrated in Fig. 8A. The lower end of a flexible projection screen 53 is suitably secured to the roller 46 so as to be rolled and unrolled therefrom. The projection screen 53 extends upwardly through the opening 40 and its upper end is looped over and secured to a suspension slat 54 which may be in the form of a tube. The ends of the suspension slat 54 may be provided with suitable knobs 55. The flexible projection screen 53 may be made out of any suitable material such as a suitable treated cloth and it may be provided with a suitable picture projection surface such as a shiny silvered surface 56. The picture projection surface 56 may be sprayed onto the projection screen. The portions of the projection screen thus far described are of conventional construction and may be modified or changed as desired or other types of constructions may be substituted for the one here illustrated by way of example.

The upper end of the flexible screen 53 is provided with a resilient strip 58 for supporting the same as illustrated in more detail in Figs. 9 and 10. The ends of the strip 58 are secured by rivets 59 to brackets 60 which in turn are secured by screws 61 to the suspension slat 54. A bracket 62 is secured to the center of the resilient strip 58 by rivets 63 and this bracket 62 carries a bail or handle 64. The bail or handle 64 is utilized for unrolling the flexible screen 53 from the roller 46 and for withdrawing the same from the screen case 36. The bail or handle 64 is also adapted to be placed over the hook portion 22 of the bracket 21 carried by the extension rod 16 for holding the flexible screen 53 in picture-exhibiting position as illustrated in Fig. 3.

As shown in more detail in Figs. 5, 6 and 7, a ring 66 provided with radially disposed holes 67 is secured to the roller 46 adjacent one end thereof. Adjacent the ring 66 the screen case 36 is provided with a slot and secured over the slot as by welding is a bracket 68. The bracket is provided with a corresponding slot 69 and is also provided with laterally extending latch surfaces or recesses 70. A pin 71 having a handle portion 72 and an offset portion 73 is adapted to be inserted through the slot 69 into one of the holes 67 in the ring 66. When this is done, the pin 71 is manipulated to rotate the roller 46 for the purpose of longitudinally tensioning the flexible screen 53 and after the desired tension is longitudinally applied to the flexible screen 53 the pin 71 may be rotated in the hole 67 to cause the same to engage one of the laterally extending latch surfaces or recesses 70 for locking the roller in that position. As the flexible screen is longitudinally tensioned in this manner, the resilient strip 58 at the upper end of the flexible screen 53 is bowed as illustrated in Fig. 3 to maintain a spring tension on the flexible screen 53 in the longitudinal direction. In this way when the flexible screen 53 is unrolled to picture exhibiting position as illustrated in Fig. 3, it may be longitudinally tensioned under spring pressure for providing a flat picture projection surface. To relieve the tension on the flexible screen 53 all that is necessary is to manipulate the pin 71 out of the latch surface or recess 70. The bracket 68 also carries a clip 74 in which the pin 71 may be received when it is removed from the holes 67 in the ring 66. This provides a convenient carrying place for the pin 71 when not in use. Misplacing of the pin 71 may be prevented by attaching the same to the bracket 66 by means of a suitable chain 75.

The side edges of the flexible screen 53 may be provided with a plurality of eyelets 77 as illustrated in more detail in Figs. 9, 10 and 11. A plurality of rods, two being illustrated, is provided for cooperating with the eyelets 77 for transversely tensioning the flexible screen 53. The rods are extensible and include a rod portion 78 telescopically received in a sleeve portion 79. The rod portion 78 and the sleeve portion 79 each carries a stud 80 by means of a pin 81, the studs 80 being received in the eyelets 77 of the screen 53. The rod portion 78 also carries a pin 82 and a coil spring 83 extends between that pin 82 and the pin 81 carried by the sleeve portion 79. This spring 83 is normally under compression and operates to extend the sleeve portion 79 with respect to the rod portion 78. Thus, when the studs 80 are inserted in the eyelets 77, the springs 83 under compression provide a resilient transverse tensioning force to the flexible screen 53 for the purpose of producing a flat picture projection surface. The screen case 36 as illustrated in more detail in Figs. 1, 4 and 7 is provided with a pair of brackets 85 having holes 86. When the extensible rods are removed from the flexible screen 53, the studs 80 thereof may be received in the holes 86 in the brackets 85 so that the extensible rods when not in use are conveniently carried by the screen case 36.

Thus, in accordance with this invention the flexible screen carried by the roller is longitudinally and transversely tensioned when unrolled to picture exhibiting position so as to provide a substantially flat picture exhibiting surface, it being necessary for best results to have a flat exhibiting surface for exhibiting three dimensional pictures projected thereon. The devices utilized for so tensioning the flexible screen are simple in construction and foolproof in operation and they may be readily manipulated for this purpose. The projection screen of this invention presenting a substantially flat exhibiting surface for three dimensional pictures projected thereon may be readily and quickly collapsed for transportation purposes and when collapsed all of the parts thereof remain as a unitary structure and are not subject to misplacement, etc.

While for purposes of illustration one form of this invention has been disclosed other forms thereof may become apparent to those skilled in the art upon reference to this disclosure and, therefore, this invention is to be limited only by the scope of the appended claims.

I claim as my invention:

1. In a projection screen for use in exhibiting three dimensional pictures and having a supporting stand, a screen case carried by the supporting stand, a spring actuated roller journaled in the screen case, a flexible screen secured at one end to the roller and adapted to be rolled thereon and having a suspension slat at its other end, and a hook on the supporting stand spaced from the screen case, said screen case and hook being locked against relative movement towards each other, in combination therewith, means for releasably securing the suspension slat to the hook in picture exhibiting position when the screen is unrolled from the roller and including resilient means connected to the suspension slat for applying a greater tensioning force to the screen than can be applied by the spring actuated roller, and means for manually rotating and locking the roller for pulling the screen against the action of the resilient means for longitudinally tensioning the same in picture exhibiting position.

2. In a projection screen for use in exhibiting three dimensional pictures and having a supporting stand, a screen case carried by the supporting stand, a spring actuated roller journaled in the screen case, a flexible screen secured at one end to the roller and adapted to be rolled thereon and having a suspension slat at its other end, and a hook on the supporting stand spaced from the screen case, said screen case and hook being locked against relative movement towards each other, in combination therewith, means for releasably securing the suspension slat to the hook in picture exhibiting position when the screen is unrolled from the roller and including a resilient strip, means for securing the ends of the resilient strip to the screen suspension slat adjacent its ends and a bail carried by the resilient strip adjacent its center for engaging over the hook for applying a greater tensioning force to the screen than can be applied by the spring actuated roller, and means for manually rotating and locking the roller for pulling the screen against the action of the resilient strip for longitudinally tensioning the same in picture exhibiting position.

3. In a projection screen for use in exhibiting three dimensional pictures and having a supporting stand, a screen case carried by the supporting stand, a spring actuated roller journaled in the screen case, a flexible screen secured at one end to the roller and adapted to be rolled thereon and having a suspension slat at its other end, and a hook on the supporting stand spaced from the screen case, said screen case and hook being locked against relative movement towards each other, in combination therewith, means for releasably securing the suspension slat to the hook in picture exhibiting position when the screen is unrolled from the roller and including resilient means connected to the suspension slat for applying a greater tensioning force to the screen than can be applied by the spring actuated roller, and means for manually rotating and locking the roller for pulling the screen against the action of the resilient means for longitudinally tensioning the same in picture exhibiting position and including a slot in the screen case having laterally extending latch recesses and a pin carried by the roller and movable along the slot for tensioning purposes and into the latch recesses for locking purposes.

4. In a projection screen for use in exhibiting three dimensional pictures and having a supporting stand, a screen case carried by the supporting stand, a spring actuated roller journaled in the screen case, a flexible screen secured at one end to the roller and adapted to be rolled thereon and having a suspension slat at its other end, and a hook on the supporting stand spaced from the screen case, said screen case and hook being locked against relative movement towards each other, in combination therewith, means for releasably securing the suspension slat to the hook in picture exhibiting position when the screen is unrolled from the roller and including resilient means connected to the suspension slat for applying a greater tensioning force to the screen than can be applied by the spring actuated roller, and means for manually rotating and locking the roller for pulling the screen against the action of the resilient means for longitudinally tensioning the same in picture exhibiting position and including a ring carried by the roller and provided with radially extending holes, a slot in the screen case adjacent the ring and having laterally extending latch surfaces, and a pin removably received in the holes of the ring and movable along the slot for tensioning purposes and into the latch recesses for locking purposes.

5. In a projection screen for use in exhibiting three dimensional pictures and having a supporting stand, a screen case carried by the supporting stand, a spring actuated roller journaled in the screen case, a flexible screen secured at one end to the roller and adapted to be rolled thereon and having a suspension slat at its other end, and a hook on the supporting stand spaced from the screen case, said screen case and hook being locked against relative movement towards each other, in combination therewith, means for releasably securing the suspension slat to the hook in picture exhibiting position when the screen is unrolled from the roller and including resilient means connected to the suspension slat for applying a greater tensioning force to the screen than can be applied by the spring actuated roller, means for manually rotating and locking the roller for pulling the screen against the action of the resilient means for longitudinally tensioning the same in picture exhibiting position, and means for transversely tensioning the screen in picture exhibiting position.

6. In a projection screen for use in exhibiting three dimensional pictures and having a supporting stand, a screen case carried by the supporting stand, a spring actuated roller journaled in the screen case, a flexible screen secured at one end to the roller and adapted to be rolled thereon and having a suspension slat at its other end, and a hook on the supporting stand spaced from the screen case, said screen case and hook being locked against relative movement towards each other, in combination therewith, means for releasably securing the suspension slat to the hook in picture exhibiting position when the screen is unrolled from the roller and including resilient means connected to the suspension slat for applying a greater tensioning force to the screen than can be applied by the spring actuated roller, means for manually rotating and locking the roller for pulling the screen against the action of the resilient means for longitudinally tensioning the same in picture exhibiting position, and means for transversely tensioning the screen in picture exhibiting position including eyelets at the marginal edges of the screen and spring actuated extensible rods having studs received in the eyelets.

7. In a projection screen for use in exhibiting three dimensional pictures and having a supporting stand, a screen case carried by the supporting stand, a spring actuated roller journaled in the screen case, a flexible screen secured at one end to the roller and adapted to be rolled thereon and having a suspension slat at its other end, and a hook on the supporting stand spaced from the screen case, said screen case and hook being locked against relative movement towards each other, in combination therewith, means for releasably securing the suspension slat to the hook in picture exhibiting position when the screen is unrolled from the roller and including resilient means connected to the suspension slat for applying a greater tensioning force to the screen than can be applied by the spring actuated roller, and means for manually rotating and locking the roller for pulling the screen against the action of the resilient means for longitudinally tensioning the same in picture exhibiting position, and including a stationary member carried by the screen case and having a plurality of latch surfaces, and movable means carried by the roller for tensioning purposes and having a member movable into engagement with the latch surfaces for locking purposes.

8. In a projection screen for use in exhibiting three dimensional pictures and having a supporting stand, a screen case carried by the supporting stand, a spring actuated roller journaled in the screen case, a flexible screen secured at one end to the roller and adapted to be rolled thereon and having a suspension slat at its other end, and a hook on the supporting stand spaced from the screen case, said screen case and hook being locked against relative movement towards each other, in combination therewith, means for releasably securing the suspension slat to the hook in picture exhibiting position when the screen is unrolled from the roller and including resilient means connected to the suspension slat for applying a greater tensioning force to the screen than can be applied by the spring actuated roller, and means for manually rotating and locking the roller for pulling the screen against the action of the resilient means for longitudinally tensioning the same in picture exhibiting position, and including a member having a plurality of latch surfaces, and a member movable into engagement with the latch surfaces for locking purposes, one of said members being carried by the screen case and the other of said members being carried by the roller.

9. In a projection screen for use in exhibiting three dimensional pictures and having a supporting stand, a screen case carried by the supporting stand, a spring actuated roller journaled in the screen case, a flexible screen secured at one end to the roller and adapted to be rolled thereon and having a suspension slat at its other end, and a hook on the supporting stand spaced from the screen case, said screen case and hook being locked against relative movement towards each other, in combination therewith, means for releasably securing the suspension slat to the hook in picture exhibiting position when the screen is unrolled from the roller and including a resilient strip, means for securing the ends of the resilient strip to the screen suspension slat adjacent its ends and a bail carried by the resilient strip adjacent its center for engaging over the hook for applying a greater tensioning force to the screen than can be applied by the spring actuated roller, and means for manually rotating and locking the roller for pulling the screen against the action of the resilient strip for longitudinally tensioning the same in picture exhibiting position, and including a stationary member carried by the screen case and having a plurality of latch surfaces, and movable means carried by the roller for tensioning purposes and having a member movable into engagement with the latch surfaces for locking purposes.

10. In a projection screen for use in exhibiting three dimensional pictures and having a supporting stand, a screen case carried by the supporting stand, a spring actuated roller journaled in the screen case, a flexible screen secured at one end to the roller and adapted to be rolled thereon and having a suspension slat at its other end, and a hook on the supporting stand spaced from the screen case, said screen case and hook being locked against relative movement towards each other, in combination therewith, means for releasably securing the suspension slat to the hook in picture exhibiting position when the screen is unrolled from the roller and including a resilient strip, means for securing the ends of the resilient strip to the screen suspension slat adjacent its ends and a bail carried by the resilient strip adjacent its center for engaging over the hook for applying a greater tensioning force to the screen than can be applied by the spring actuated roller, and means for manually rotating and locking the roller for pulling the screen against the action of the resilient strip for longitudinally tensioning the same in picture exhibiting position, and including a member having a plurality of latch surfaces, and a member movable into engagement with the latch surfaces for locking purposes, one of said members being carried by the screen case and the other of said members being carried by the roller.

11. In a projection screen for use in exhibiting three dimensional pictures and having a supporting stand, a screen case carried by the supporting stand, a spring actuated roller journaled in the screen case, a flexible screen secured at one end to the roller and adapted to be rolled thereon and having a suspension slat at its other end, and a hook on the supporting stand spaced from the screen case, said screen case and hook being locked against relative movement towards each other, in combination therewith, means for releasably securing the suspension slat to the hook in picture exhibiting position when the screen is unrolled from the roller and including resilient means connected to the suspension slat for applying a greater tensioning force to the screen than can be applied by the spring actuated roller, and means for longitudinally tensioning the screen in picture exhibiting position including means for locking the roller against rotation in the unrolling direction to allow the resilient means to longitudinally tension the screen.

12. In a projection screen for use in exhibiting three dimensional pictures and having a supporting stand, a screen case carried by the supporting stand, a spring actuated roller journaled in the screen case, a flexible screen secured at one end to the roller and adapted to be rolled thereon and having a suspension slat at its other end, and a hook on the supporting stand spaced from the screen case, said screen case and hook being locked against relative movement towards each other, in combination therewith, means for releasably securing the suspension slat to the hook in picture exhibiting position when the screen is unrolled from the roller and including a resilient strip, means for securing the ends of the resilient strip to the screen suspension slat adjacent its ends and a bail carried by the resilient strip adjacent its center for engaging over the hook for applying a greater tensioning force to the screen than can be applied by the spring actuated roller, and means for longitudinally tensioning the screen in picture exhibiting position including means for locking the roller against rotation in the unrolling direction to allow the resilient means to longitudinally tension the screen.

13. In a projection screen for use in exhibiting three dimensional pictures and having a supporting stand, a screen case carried by the supporting stand, a spring actuated roller journaled in the screen case, a flexible screen secured at one end to the roller and adapted to be rolled thereon and having a suspension slat at its other end, and a hook on the supporting stand spaced from the screen case, said screen case and hook being locked against relative movement towards each other, in combination therewith, means for releasably securing the suspension slat to the hook in picture exhibiting position when the screen is unrolled from the roller and including resilient means connected to the suspension slat for applying a greater tensioning force to the screen than can be applied by the spring actuated roller, and means for longitudinally tensioning the screen in picture exhibiting position including means for locking the roller against rotation in the unrolling direction to allow the resilient means to longitudinally tension the screen, said roller locking means including a member having a plurality of latch surfaces, and a member movable into engagement with the latch surfaces for locking purposes, one of said members being carried by the screen case and the other of said members being carried by the roller.

14. In a projection screen for use in exhibiting three dimensional pictures and having a supporting stand, a screen case carried by the supporting stand, a spring actuated roller journaled in the screen case, a flexible screen secured at one end to the roller and adapted to be rolled thereon and having a suspension slat at its other end, and a hook on the supporting stand spaced from the screen case, in combination therewith, means for releasably securing the suspension slat to the hook in picture exhibiting position when the screen is unrolled from the roller and including a resilient strip, means for securing the ends of the resilient strip to the screen suspension slat adjacent its ends and a bail carried by the resilient strip adjacent its center for engaging over the hook for applying a greater tensioning force to the screen than can be applied by the spring actuated roller, and means for longitudinally tensioning the screen in picture exhibiting position including means for locking the roller against rotation in the unrolling direction to allow the resilient means to longitudinally tension the screen, said roller locking means including a member having a plurality of latch surfaces, and a member movable into engagement with the latch surfaces for locking purposes, one of said members being carried by the screen case and the other of said members being carried by the roller.

References Cited in the file of this patent

UNITED STATES PATENTS

| | | |
|---|---|---|
| 295,163 | Grove | Mar. 18, 1884 |
| 819,396 | Angeletti | May 1, 1906 |
| 978,548 | Bommer | Dec. 13, 1910 |
| 1,125,762 | Sturtevant | Jan. 19, 1915 |
| 1,383,730 | La Voie | July 5, 1921 |
| 1,836,387 | Nye | Dec. 15, 1931 |
| 1,946,639 | Riddell | Feb. 13, 1934 |
| 2,246,995 | Ingersoll | June 24, 1941 |
| 2,417,711 | Smith | Mar. 18, 1947 |
| 2,498,563 | Mallory | Feb. 21, 1950 |
| 2,546,299 | Du Mais | Mar. 27, 1951 |
| 2,549,584 | Eller | Apr. 17, 1951 |
| 2,591,685 | Du Mais et al. | Apr. 8, 1952 |
| 2,696,249 | Prokop et al. | Dec. 7, 1954 |